July 27, 1954    H. J. ANDERSON    2,685,005
AUTOMATIC WARNING SIGNAL
Filed Jan. 6, 1951    2 Sheets-Sheet 1
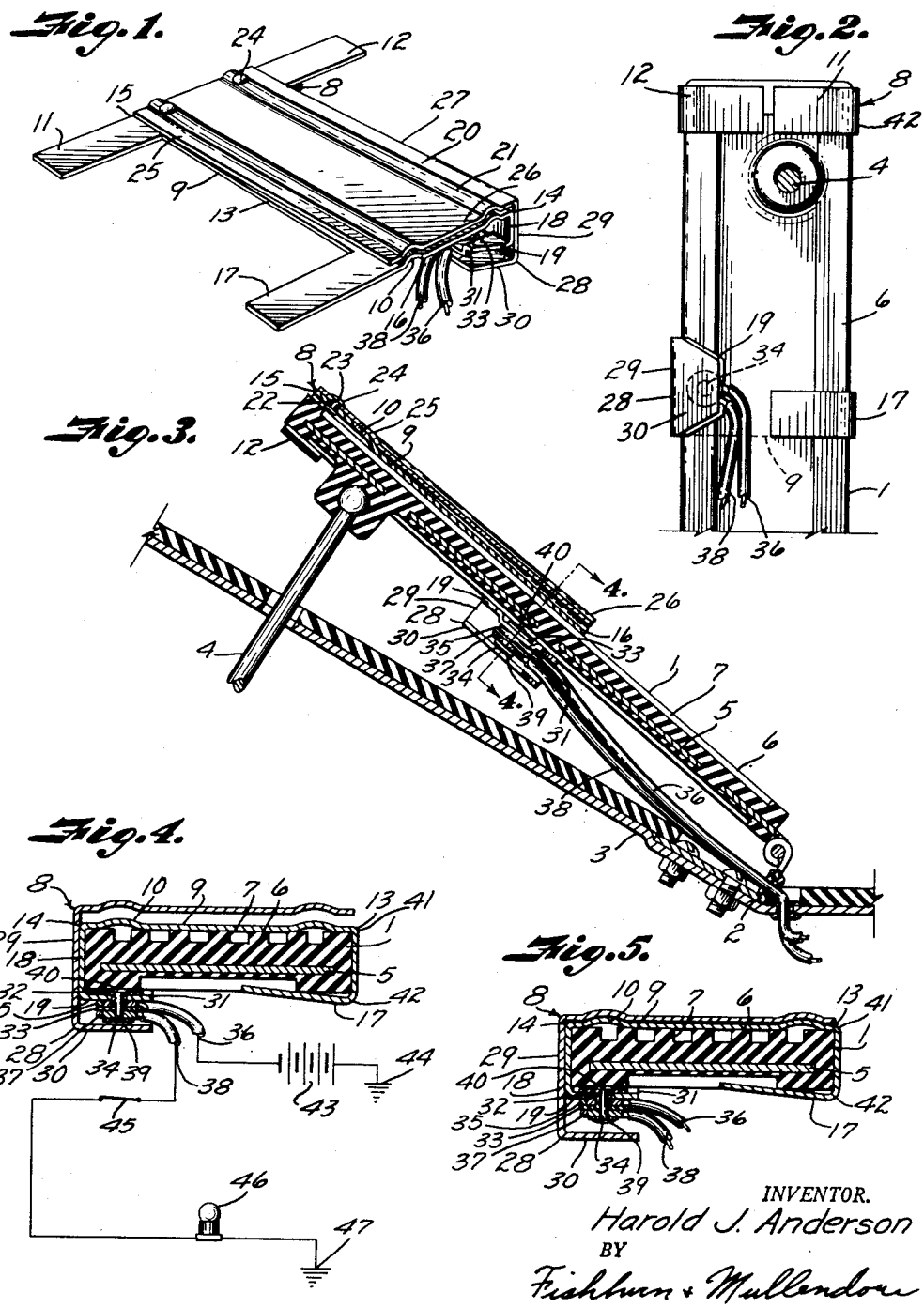
INVENTOR.
Harold J. Anderson
BY
Fishburn & Mullendore
ATTORNEYS July 27, 1954        H. J. ANDERSON        2,685,005
AUTOMATIC WARNING SIGNAL
Filed Jan. 6, 1951        2 Sheets—Sheet 2
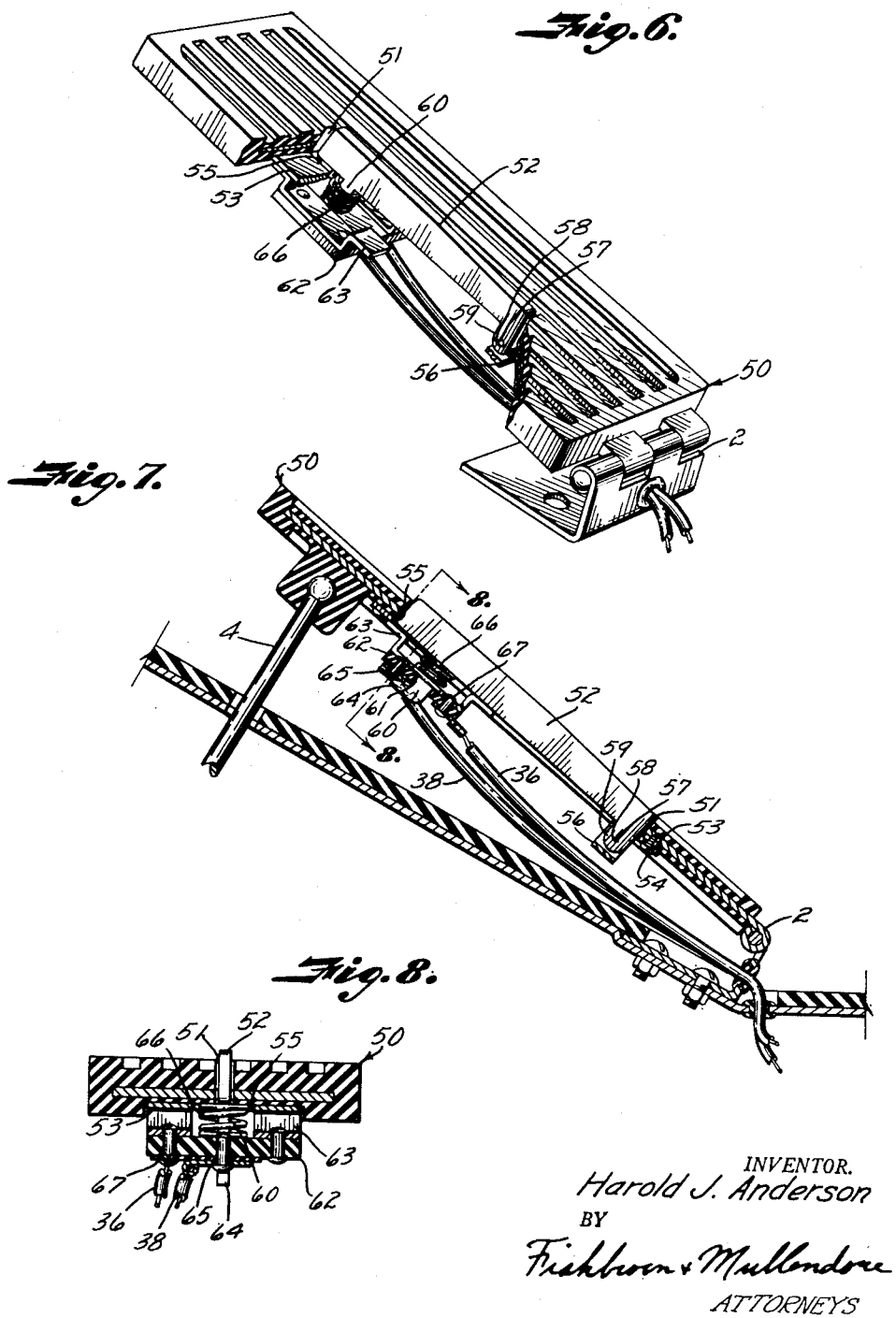
INVENTOR.
Harold J. Anderson
BY
Fishburn & Mullendore
ATTORNEYS Patented July 27, 1954

2,685,005

UNITED STATES PATENT OFFICE 2,685,005

AUTOMATIC WARNING SIGNAL

Harold J. Anderson, Kansas City, Mo., assignor to Northeast Tool & Die Works, Inc., Kansas City, Mo., a corporation of Missouri Application January 6, 1951, Serial No. 204,747

1 Claim. (Cl. 200—61.89)

This invention relates to automatic warning signals and more particularly to such a warning signal for vehicles such as automobiles to indicate when pressure of the operator's foot is removed from the vehicle accelerator pedal.

In the operation of a vehicle particularly in traffic many accidents or collisions occur due to the slowness of relaying a signal from a lead vehicle or subsequent vehicles to the following or trailing vehicles when it is necessary to slow down or come to a complete stop unexpectedly. While the operator may observe something that causes him to remove pressure of his foot on the accelerator and be ready to apply the brakes if necessary, the operator of a trailing vehicle usually has no warning or indication that the operator of the lead car has removed his foot or pressure thereof from the accelerator until said operator of the lead vehicle has depressed his brake pedal. In heavy or fast moving traffic the shortness of time elapsing from the time of energizing the stop light by partial depression of the foot brake to full pressure on said foot brake for sudden stops is such that the lead vehicle may reduce speed faster than the trailing vehicle, thereby causing the trailing vehicle to more closely approach and possibly collide with the leading vehicle before the operator of the trailing vehicle has time to properly apply his brakes for adequate reduction in speed.

The objects of the present invention are to provide an automatic warning signal for immediately advising the operator of a trailing vehicle that there is no longer pressure being applied to the accelerator of the lead car; to provide a switch mounted on the accelerator pedal of a vehicle in electrical circuit with a rear signal device such as a signal light bulb to impart an automatic immediate signal when depressing pressure of the operator's foot is removed from the accelerator; to provide such a device with a manual control for breaking the electrical circuit to the switch and warning signal as when the vehicle is at rest; and to provide a simple, efficient switch structure on an accelerator pedal of a vehicle and electric circuit therefor for positively interrupting the circuit to a signal light bulb when the operator's foot is resting on the accelerator pedal or depressing said pedal under vehicle operating conditions and completing the circuit to the signal light bulb to indicate possible slowing and/or stopping of the vehicle when the pressure of the operator's foot is not engaged with the switch structure on the accelerator pedal.

In accomplishing these and other objects of the present invention, I have provided improved details of structure, the preferred forms of which are illustrated in the accompanying drawings, wherein:

Fig. 1 is a perspective view of the switch embodying the features of my invention and adapted for mounting on an accelerator pedal.

Fig. 2 is a bottom plan view of the forward position of an accelerator pedal with the switch thereon.

Fig. 3 is a longitudinal sectional view through the accelerator pedal and switch mounted thereon.

Fig. 4 is a detail section through the accelerator pedal and switch on the line 4—4, Fig. 3, showing the switch in closed position and a wiring diagram of the signal light connected therewith.

Fig. 5 is a transverse section similar to Fig. 4 with the switch in open position.

Fig. 6 is a perspective view of a modified form of accelerator pedal and switch.

Fig. 7 is a longitudinal sectional view through the modified form of accelerator pedal and switch showing the switch in closed position.

Fig. 8 is a transverse sectional view through the modified form of accelerator pedal and switch on the line 8—8, Fig. 7.

Referring more in detail to the drawings:

1 designates an accelerator pedal hingedly mounted as at 2 on the floor 3 of a vehicle and connected by an actuator rod 4 to a fuel control such as a carburetor (not shown) as in conventional practice. The pedal is of conventional structure, having an inner support plate 5 surrounded by a molded portion 6 composed of nonconducting material such as rubber or the like. The portion 6 has the usual tread 7 on the upper surface. An electric switch 8, constructed in accordance with the present invention, is adapted to be securely attached to the accelerator pedal 1 of the vehicle and includes a rectangular base plate 9 constructed of an electrically conductive material such as copper or the like, preferably having laterally spaced longitudinal ribs 10 to lend rigidity thereto. The base plate 9 is provided with oppositely directed arms or fingers 11 and 12 extending laterally from side edges 13 and 14 at the forward end 15 thereof. Located at the rear end 16 of base plate 9 and extending laterally from side edge 13 is a finger 17 similar to finger 11. Extending downwardly from side edge 14, opposite finger 17, is a depending portion 18 having an inwardly turned flange 19 which serves as a switch contact member for a purpose later described.

A spring plate or arm 20 preferably having substantially the same rectangular shape and size as the base plate 9 and having laterally spaced longitudinal ribs 21 adapted to nest over ribs 19 is arranged over the base plate 9. Suitable aligning apertures 22 and 23 are arranged in the base plate 9 and spring plate 20 preferably in the forward portions of the ribs 19 and 21, said apertures being adapted to receive suitable fastening devices such as rivets 24 to secure the forward portions of the base plate 9 and spring plate 20 together. The forward end of spring plate 20 is held in contacting engagement with forward end 15 of base plate 9 and said spring plate 20 bent slightly upwardly as at 25 so that the rear end 26 thereof is normally spaced above the rear portion of base plate 9 by the resiliency of the spring plate. However, slight pressure of an operator's foot on the spring plate will move or depress the rear portion thereof into engagement with the upper face of the base plate. Depending from the side 27 adjacent the rear end 26 of the spring plate 20 is a contact member 28 having a vertical wall 29 provided with an inwardly extending flange 30 substantially aligned with and underlying the inturned flange 19 on the base plate.

The inwardly extending flange 19 or contact member on the base plate 9 is provided with a central depression 31 having an opening 32 adapted to receive an insulation grommet 33 surrounding the upper end of a rivet 34. Secured around the central portion of grommet 33 in contacting engagement with the flange 19 is the terminal end 35 of a conductor 36 which is insulated from the rivet 34 by means of said grommet 33. Secured to the lower end of rivet 34 and in contacting engagement therewith is the terminal end 37 of a conductor 38. The rivet 34 is provided with the usual head 39 at the lower end thereof cooperating with a head 40 at the upper end to rigidly secure the terminal ends of conductors 36 and 38 and insulating grommet 33 to the flange 19 so that the terminal end of conductor 36 is in electrical contact with flange 19 and insulated from rivet 34 which is in contact with the terminal end of conductor 38 and insulated from flange 19. The flange 30 of contact member 28 is thus in position to contact the rivet head 39, making connection with conductor 38 and acting as a stop to limit the upward movement of the rear portion 26 of the spring plate 20 relative to the base plate 9.

In mounting the switch 8 to the accelerator pedal 1, the under side of the base plate 9 is moved into contact with the upper or tread surface of the accelerator pedal and the depending portion 18 engaged with the side of the accelerator pedal whereby the flange 19 thereof grippingly contacts the lower surface of the pedal. The switch is then moved into the desired position, which is preferably with the forward end thereof aligned with the forward end of the pedal 1, but it is obvious that it could be positioned any place on the entire length of the accelerator pedal. The arms or fingers 11, 12 and 17 are then bent downwardly around the side edges of the accelerator pedal as at 41 and then bent inwardly as at 42 to grip the accelerator pedal to securely attach the switch thereto. The conductor 35 is suitably connected to the usual vehicle battery 43 having a ground connection 44. The conductor 38 is provided with a manual switch 45 such as the ignition switch of the vehicle and also is connected in series circuit with a signal light bulb 46 having a suitable ground 47 to complete the circuit to battery 43. With the switch 8 constructed and mounted to the accelerator pedal 1 and connected in series with the signal light bulb 46, as described, the operation is as follows:

The spring plate 20 being resiliently mounted relative to the base plate 9 will normally keep the switch 8 closed by the spring plate urging the flange 30 into contact with the rivet 34. Thus current from the battery 43 will flow through conductor 35, flange 19 and depending portion 18 which is in sliding contact with the vertical wall 29, then through the flange 30, rivet 34, conductor 38, switch 45, and signal 46 to the ground 47, as illustrated in Fig. 4. When depressing pressure is applied to spring plate 20 as when the operator's foot rests thereon even though the accelerator is not depressed, the flange 30 is disengaged from the rivet 34, breaking the circuit between conductors 35 and 38, as shown in Fig. 5, and interrupting flow of current to the signal light 46.

In starting a vehicle provided with switch 8 connected in circuit with light bulb 46 which is preferably located in a housing (not shown) mounted in a conventional manner at the rear of the vehicle, the ignition switch 45 is closed and the engine started. The circuit is then completed to switch 8 so that the operator of the signal light 46 is dependent upon switch 8 and said signal light will be energized whenever the pressure of the operator's foot is removed from the spring plate 16 sufficiently to permit the flange 30 to engage the rivet head 39. When pressure is applied to the switch spring plate 20 sufficiently to disengage the flange 30 from the rivet head 39, the signal light is deenergized. Also when pressure is applied to depress the accelerator pedal as when the vehicle is traveling at a constant speed or accelerated speed the signal light will be out. The light will instantly and automatically come on when pressure is removed from spring plate 20 as when decelerating due to the braking force of the engine or due to removal of the operator's foot for application of the brakes. When pressure is removed from the accelerator pedal and switch to apply the brakes the automatic rear signal will act as a supplemental warning prior to the rear stop signal of the brakes.

In the form of the invention illustrated in Figs. 6 to 8 inclusive, the accelerator pedal 50 is hingedly mounted as at 2 and connected to an actuator rod 4 in the same manner as described relative to the accelerator pedal shown in Fig. 3. The accelerator pedal 50 is provided with a longitudinal slot 51 preferably centrally located and of such size as to permit an arm 52 to freely operate therein. A bracket 53 is secured to the under side of the accelerator pedal as by suitable fastening devices 54 and has a slot 55 which substantially registers with the slot 51 in the pedal 50. Suitable ears 56 depend from the bracket 53 adjacent the rear end thereof and carry a pin 57 which extends through an aperture 58 of an ear 59 that depends from the arm 52 to pivotally mount said arm on the bracket 53. A finger 60 depends from the arm 52 adjacent the forward end thereof and extends through a slot 61 of a non-conducting plate 62 suitably secured to laterally spaced depending supports 63 carried on the bracket 53. The lower end of the finger 60 terminates in a forwardly extending contact portion 64 movable into and out of engagement with the contact 65 mounted on the non-conducting plate 62 and insulated from the bracket 53. The contact 65 is suitably connected by a conductor 38 of a signal lamp circuit. A coil spring 66 is sleeved around the finger 60 and has one end engaging the upper surface of the nonconducting plate 62 and the other end engaging the bottom of the arm 52 to resiliently urge the arm in upward swinging movement to move the contact 64 into engagement with the contact 65. However, if the automobile operator places his foot on the accelerator pedal the foot will engage the arm 52 hinging same downwardly, compressing the spring 66 and disengaging the contact 64 from the contact 65 to interrupt the signal circuit. The conductor 36 of the signal circuit is connected by a suitable fastening device 67 to the bracket 53 whereby when no pressure is applied to the arm 52, current can flow through the conductor 36, bracket 53, pin 58, arm 52, finger 60, contact 64, contact 65 and conductor 38, thereby providing substantially the same operation as was described in the form of the invention illustrated in Figs. 1 to 5 inclusive.

It is obvious from the foregoing that I have provided an accelerator switch connected in circuit with a rear signal device that will instantly and automatically impart a warning signal to following vehicles when pressure is removed from the accelerator pedal and switch, regardless of the position of the accelerator pedal in respect to the floor of the vehicle.

What I claim and desire to secure by Letters Patent is:

An electric switch for controlling a vehicle circuit comprising, an accelerator pedal covered with an electrical nonconductor, said accelerator pedal having a longitudinal slot extending therethrough intermediate the ends thereof, a bracket secured to the under side of the accelerator pedal adjacent the slot, an arm having one end hingedly mounted on the bracket below the upper surface of the pedal for swinging movement of the arm in the slot, resilient means normally positioning the free end of the arm above the surface of the accelerator pedal for engagement by an operator's foot, a pair of electrical contacts, one of said contacts being fixed relative to the accelerator pedal and adjacent to the free end of the arm, the other contact being insulated from said one contact, said contacts being respectively connected in a circuit to be controlled, and means on the arm and movable thereby into and out of circuit-making engagement with said contacts, the resilient means normally positioning the arm whereby the free end of the arm is above the upper surface of the pedal and the means on the arm is engaging the contacts in circuit-making position when the accelerator pedal is at rest and no depressing pressure is applied to the arm, the means on the arm being disengaged from the contacts and in circuit-breaking position when depressing pressure is applied to said arm to move the free end thereof toward a position substantially level with the upper surface of the pedal and during depression of the accelerator pedal in vehicle operating positions.

References Cited in the file of this patent

UNITED STATES PATENTS

| Number | Name | Date |
| --- | --- | --- |
| 1,760,212 | Ruble | May 27, 1930 |
| 1,823,083 | Brown | Sept. 15, 1931 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,435,389 | Good | Feb. 3, 1948 |
| 2,463,088 | Coombs | Mar. 1, 1949 |